Patented Oct. 8, 1940

2,217,566

UNITED STATES PATENT OFFICE 2,217,566

INSECTICIDE

Lloyd E. Smith, Washington, D. C., dedicated to the free use of the Public of the United States of America No Drawing. Application June 9, 1934, Serial No. 729,830

3 Claims. (Cl. 167—33)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the Public in the territory of the United States of America to take effect upon the granting of a patent to me.

This invention relates to improvements in materials for destroying or checking the growth or multiplication of living organisms, whether plant or animal, which are economically injurious to man.

An object of the invention is to provide a material suitable for use as an insecticide.

Another object of the invention is to provide a material for dusting or spraying delicate vegetation such as bean plants, peach trees, and plants grown under glass which will not cause injury to foliage.

Another object of the invention is to provide a material which is relatively nontoxic to man and domestic animals when taken by mouth and which can be used in place of lead arsenate and other arsenicals for destroying insects without leaving harmful residue on fruits and vegetables.

I have found that organic compounds made by heating diarylamines with sulphur in the presence of a suitable catalyst such as anhydrous aluminum chloride, iodine, etc., are effective in killing many species of insects whether applied externally or internally; that these organic products may be sprayed or dusted upon delicate vegetation without injuring it; that these materials are even more effective than lead arsenate and other commonly used insecticides and that they are relatively nontoxic to warm-blooded animals. Suitable products according to this invention are thiodiphenylamine (phenthiazine), thiodinaphthylamine, (either alpha- or beta-); mixed thiodiarylamines, for example, the products made by heating phenylnaphthylamine with sulphur and aluminum chloride; and various derivatives of these compounds such as alkyl, nitro, amino and halogeno derivatives. Compounds formed by attaching substituents to sulphur and/or nitrogen are also suitable for insecticidal use.

One of the preferred compounds comprised in my invention is phenthiazine. This is made by melting together diphenylamine, sulphur, and a suitable catalyst such as anhydrous aluminum chloride, iodine, etc. The reaction is essentially as follows:

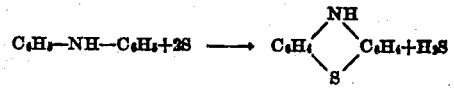

Phenthiazine occurs as yellowish leaflets, melting at 180°. It is insoluble in water but soluble in organic solvents. For use as an insecticide it is not necessary to use purified phenthiazine. The crude product of the above reaction after removal of the catalyst by washing with water or other suitable means, can be utilized directly. The product may be reduced to impalpable powder by grinding, and applied to vegetation either dry as a dust or wet as as pray. When applied as a spray in water it is desirable to incorporate an effective wetting agent such as one of the so-called sulphonated oils. Phenthiazine may also be applied by dissolving it in acetone and pouring the acetone solution into water whereupon a fine colloidal precipitate is formed. This may be applied directly to plants or it may be combined with a suitable wetting agent and then sprayed.

The value of phenthiazine as an insecticide in comparison with rotenone and lead arsenate and its non-injuriousness to foliage are shown by the following tests:

1. Upon mosquito larvae in aqueous solutions phenthiazine in all concentrations up to 1 part in 2,000,000 was more effective than rotenone.

2. In laboratory tests upon silkworms, tent caterpillars, codling moth, cabbage worms, celery leaf tier, and diamond back moth, phenthiazine as a spray or dust was at the same dosage more effective than lead arsenate.

3. Phenthiazine, with fuller's earth as a wetting agent, when sprayed upon apple, peach, cherry, quince and other fruit trees, beans, coleus, Jerusalem cherry and citrus seedlings, at the rate of 2 pounds phenthiazine per 50 gallons of water was nontoxic to foliage.

Having thus described my invention I claim:

1. An insecticide containing as its essential active ingredient phenthiazine.

2. An insecticidal composition comprising a water-insoluble, thio-di-arylamine.

3. An insecticidal spray comprising an aqueous suspension of phenthiazine.

LLOYD E. SMITH.